US012461475B2

(12) United States Patent
Koga et al.

(10) Patent No.: US 12,461,475 B2
(45) Date of Patent: Nov. 4, 2025

(54) IMAGE FORMING APPARATUS

(71) Applicant: CANON KABUSHIKI KAISHA, Tokyo (JP)

(72) Inventors: Katsuhide Koga, Ibaraki (JP); Kazusa Morimoto, Chiba (JP); Norio Negishi, Tokyo (JP); Hiroki Sato, Ibaraki (JP); Takahiro Oonuma, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/883,169

(22) Filed: Sep. 12, 2024

(65) Prior Publication Data

US 2025/0093805 A1 Mar. 20, 2025

(30) Foreign Application Priority Data

Sep. 14, 2023 (JP) ................................ 2023-149049

(51) Int. Cl.
*G03G 15/00* (2006.01)

(52) U.S. Cl.
CPC ..... *G03G 15/5029* (2013.01); *G03G 15/6529* (2013.01); *G03G 15/6558* (2013.01); *G03G 2215/00637* (2013.01)

(58) Field of Classification Search
CPC ........... G03G 15/5029; G03G 15/6529; G03G 15/6558; G03G 15/6567; G03G 15/6588–6594; G03G 2215/00561; G03G 2215/00565; G03G 2215/00611; G03G 2215/00616; G03G 2215/0062; G03G 2215/00637; G03G 2215/00675; G03G 2215/00679; G03G 2215/00683; G03G 2215/00717; G03G 2215/00738; G03G 2215/00742; G03G 2215/00751; G03G 2215/00763; G03G 2215/00767;
(Continued)

(56) References Cited

U.S. PATENT DOCUMENTS

| | | | | |
|---|---|---|---|---|
| 8,045,868 | B2 * | 10/2011 | Kuramochi | B65H 7/02 399/45 |
| 8,391,735 | B2 | 3/2013 | Kuramochi et al. | |
| 9,052,664 | B2 | 6/2015 | Kuramochi et al. | |

(Continued)

FOREIGN PATENT DOCUMENTS

| | | | |
|---|---|---|---|
| JP | 2021056299 | A | 4/2021 |

*Primary Examiner* — Carla J Therrien
(74) *Attorney, Agent, or Firm* — ROSSI, KIMMS & McDOWELL LLP

(57) ABSTRACT

An image forming apparatus includes a conveyance unit configured to convey a sheet, a measurement unit for measuring a feature amount of the sheet conveyed by the conveyance unit, a sheet detection sensor for detecting the sheet conveyed by the conveyance unit, a pressing member movable between a first position separated from the measurement unit and a second position closer to the measurement unit than the first position, a moving unit configured to move the pressing member, an image forming unit configured to form, based on a predetermined image forming condition, an image on the sheet conveyed by the conveyance unit, and a controller, the controller is configured to stop conveyance of the sheet by the conveyance unit in a case where the sheet is detected by the sheet detection sensor.

10 Claims, 12 Drawing Sheets

(58) Field of Classification Search
CPC ............ G03G 2215/00784; B65H 5/36; B65H 2404/153; B65H 2404/1544; B65H 2553/83
See application file for complete search history.

(56) References Cited

U.S. PATENT DOCUMENTS

| | | | |
|---|---|---|---|
| 11,940,750 | B2 | 3/2024 | Yoshikawa et al. |
| 2006/0022400 | A1* | 2/2006 | Kawasaki .............. B41J 11/009 271/227 |
| 2020/0255239 | A1* | 8/2020 | Izumiya ................... B65H 7/02 |
| 2020/0356037 | A1* | 11/2020 | Yoshimura ......... G03G 15/5029 |
| 2021/0078816 | A1* | 3/2021 | Izumiya ................... B65H 7/14 |
| 2022/0076087 | A1 | 3/2022 | Ogushi |
| 2022/0177257 | A1* | 6/2022 | Ogata .................... B65H 43/08 |
| 2024/0126199 | A1* | 4/2024 | Sato ................... G03G 15/5004 |
| 2025/0093803 | A1* | 3/2025 | Oonuma ............ G03G 15/6529 |
| 2025/0093804 | A1* | 3/2025 | Morimoto .......... G03G 15/6558 |

* cited by examiner

| PRINT MODE | ADJACENT PIXEL DIFFERENCE INTEGRATED VALUE | | BRIGHTNESS | | SHEET TYPE | BASIS WEIGHT | |
|---|---|---|---|---|---|---|---|
| | LOWER LIMIT | UPPER LIMIT | LOWER LIMIT | UPPER LIMIT | | LOWER LIMIT | UPPER LIMIT |
| THIN PAPER SHEET 2 | b1 | b2 | a2 | a3 | PLAIN PAPER SHEET | c1 | c2 |
| THIN PAPER SHEET 1 | b1 | b2 | a2 | a3 | PLAIN PAPER SHEET | c2 | c3 |
| ... | ... | ... | ... | ... | ... | ... | ... |
| THICK PAPER SHEET 6 | b1 | b2 | a2 | a3 | PLAIN PAPER SHEET | c22 | c23 |
| ... | ... | ... | ... | ... | ... | ... | ... |
| RECYCLED PAPER SHEET 2 | b2 | b3 | a2 | a3 | PLAIN PAPER SHEET | c9 | c13 |
| ... | ... | ... | ... | ... | ... | ... | ... |
| COATED PAPER SHEET 1 | b0 | b1 | a2 | a3 | COATED PAPER SHEET | c13 | c18 |
| COATED PAPER SHEET 2 | b0 | b1 | a2 | a3 | COATED PAPER SHEET | c18 | c22 |
| ... | ... | ... | ... | ... | ... | ... | ... |

FIG. 10

IMAGE FORMING APPARATUS

BACKGROUND OF THE INVENTION

The present disclosure relates to an image forming apparatus which includes a media sensor for discriminating a type of a sheet (sheet type).

DESCRIPTION OF THE RELATED ART

In recent years, image forming apparatus include a media sensor for discriminating a type of a sheet, which is a recording medium. The media sensor measures feature amounts of the sheet by using, for example, an optical sensor or an ultrasonic wave sensor. The image forming apparatus extracts, based on measurement results of the feature amounts of the sheet obtained by the media sensor, relevant sheet information from sheet information registered in advance and discriminates the type of the sheet (sheet type). The sheet information is information including the feature amounts (for example, basis weight and surface properties) for each sheet type. The image forming apparatus prints an image on the sheet based on image forming conditions corresponding to the determined sheet type. In U.S. Pat. No. 8,045,868, there is disclosed an image forming apparatus which forms an image by determining the sheet type.

In the related art, image forming apparatus of this type temporarily stops a sheet at a measurement position of a media sensor, and then causes the sheet to abut against the media sensor. The image forming apparatus then restarts the conveyance of the sheet, measures feature amounts while conveying the sheet, determines the sheet type, and sets image forming conditions. In a case where a period of time required from measuring the feature amounts of the sheet to setting the image forming conditions is long, there is a possibility that the image may be printed on the sheet before the image forming conditions are set. In this case, there is a fear that it may not be possible to perform printing with the image forming conditions set corresponding to the type of sheet.

SUMMARY OF THE INVENTION

An image forming apparatus according to at least one embodiment of the present disclosure includes a conveyance unit configured to convey a sheet, a measurement unit for measuring a feature amount of the sheet conveyed by the conveyance unit, a sheet detection sensor for detecting the sheet conveyed by the conveyance unit, a pressing member movable between a first position separated from the measurement unit and a second position closer to the measurement unit than the first position, a moving unit configured to move the pressing member, an image forming unit configured to form, based on a predetermined image forming condition, an image on the sheet conveyed by the conveyance unit, and a controller, wherein the controller is configured to stop conveyance of the sheet by the conveyance unit in a case where the sheet is detected by the sheet detection sensor, and control the moving unit to move the pressing member from the first position to the second position, control, under a state in which the pressing member is arranged at the second position, the conveyance unit to restart the conveyance of the sheet to control the measurement unit to measure the feature amount of the sheet, and determine the predetermined image forming condition based on the measured feature amount, and stop the conveyance of the sheet by the conveyance unit before the image forming unit forms an image on the sheet to set the predetermined image forming condition in the image forming unit, and restart the conveyance of the sheet by the conveyance unit to control the image forming unit to form an image based on the predetermined image forming condition.

Further features of the present invention will become apparent from the following description of exemplary embodiments (with reference to the attached drawings).

BRIEF DESCRIPTION OF THE DRAWINGS

FIG. 10 is an exemplary diagram of a classification table of sheet types.

DESCRIPTION OF THE EMBODIMENTS

Now, referring to the accompanying drawings, description is given of at least one exemplary embodiment of the present disclosure. In the following description, "basis weight" is the mass per unit area of a sheet, and is expressed in units of gsm.

<Image Forming Apparatus>

Figure 1:
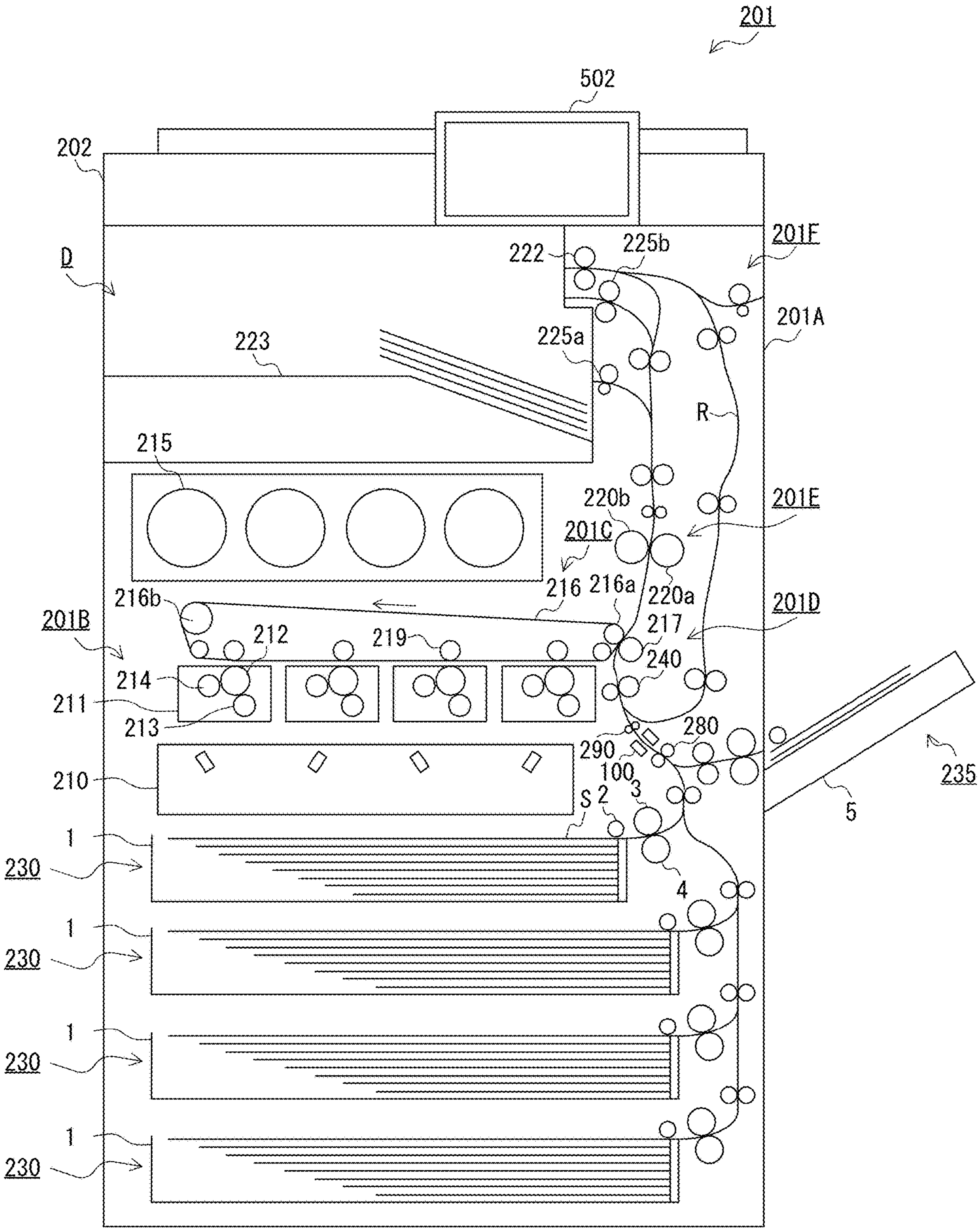
FIG. 1 is a configuration view of an image forming apparatus.

FIG. 1 is a configuration view of an image forming apparatus according to the at least one embodiment. An image forming apparatus 201 according to the at least one embodiment is, for example, a laser beam printer of a tandem intermediate-transfer type using an electrophotographic process. The image forming apparatus 201 forms a full-color image or a monochrome image on a sheet S being a recording medium and outputs the sheet S based on image data acquired from an external device such as a personal computer via a network or based on image data acquired from an image reading device 202 which is provided on the top of the image forming apparatus 201.

The image forming apparatus 201 has, inside a main body 201A, components for forming an image, and includes, on the top of the main body 201A, the image reading device 202 and an operation unit 502. A delivery space D including a placement portion 223 for receiving the sheet S to be delivered thereinto after image formation is defined between the main body 201A of the image forming apparatus 201 and the image reading device 202.

The image reading device 202 is a reader which reads an image from an original to generate image data. The image reading device 202 is used, for example, at the time of processing of copying an original. The image reading device 202 in the at least one embodiment is configured as a part of the image forming apparatus 201. However, the image reading device 202 is not limited to this configuration, and the image reading device 202 may be electrically connected to the image forming apparatus 201 as a device different from the image forming apparatus 201.

The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The image forming apparatus 201 notifies the user of various types of information by displaying various screens on the display of the operation unit 502. The operation unit 502 in the at least one embodiment is configured as a part of the image forming apparatus 201. The operation unit 502 is not limited to this configuration, and the operation unit 502 may be electrically connected to the image forming apparatus 201 as a device different from the image forming apparatus 201.

The image forming apparatus 201 includes, in the main body 201A, an image forming unit 201B, an intermediate transfer unit 201C, a secondary transfer unit 201D, a fixing device 201E, and cassette sheet-feeding units 230. The main body 201A includes a manual sheet-feeding unit 235.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In the at least one embodiment, description is given of a configuration in which a plurality of (in this example, four) cassette sheet-feeding units 230 are provided. However, any number of cassette sheet-feeding units 230 may be provided. The sheet S fed from the cassette sheet-feeding unit 230 is conveyed to a registration roller pair 240 via conveyance roller pairs 280 and 290.

The sheet S can be fed from a unit other than the cassette sheet-feeding unit 230, that is, from the manual sheet-feeding unit 235. The manual sheet-feeding unit 235 includes a manual feeding tray 5 for receiving sheets S placed by the user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 via the conveyance roller pairs 280 and 290. The conveyance roller pairs 280 and 290 are rotating members for conveying the sheet S.

A media sensor 100 for measuring feature amounts of the sheet S is arranged on a conveyance path between the conveyance roller pair 280 and the conveyance roller pair 290. The conveyance roller pair 280 is arranged on an upstream side of the media sensor 100 in a conveyance direction of the sheet S, and the conveyance roller pair 290 is arranged on a downstream side of the media sensor 100 in the conveyance direction of the sheet S. The media sensor 100 outputs, for example, information corresponding to a basis weight (basis weight information) and information corresponding to surface properties (surface property information) as feature amounts of the sheet S conveyed from the cassette sheet-feeding unit 230 or the manual sheet-feeding unit 235. The media sensor 100 may be arranged at at least one or both of a position at which the sheet S fed from the cassette sheet-feeding unit 230 can be measured and a position at which the sheet S fed from the manual sheet-feeding unit 235 can be measured. Details of the configuration of the media sensor 100 are described later.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 replenish the respective developing devices 214 with toner.

The intermediate transfer unit 201C includes an intermediate transfer belt 216 wound around a drive roller **216*a* and a tension roller 216*b*. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216*a*** driven by a drive unit (not shown).

The secondary transfer unit 201D includes a secondary transfer roller 217 provided so as to sandwich the intermediate transfer belt 216 at a position opposing the drive roller **216*a*. The fixing device 201E is provided on a downstream side of the secondary transfer roller 217 in the conveyance direction of the sheet S, and includes a pressure roller 220*a* and a heating roller 220*b*. On a downstream side of the fixing device 201E in the conveyance direction of the sheet S, there are arranged a first delivery roller pair 225*a*, a second delivery roller pair 225*b*, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed to the image forming unit 201**B.

The image forming apparatus 201 having the configuration as described above operates as follows. The image forming apparatus 201 acquires, together with an instruction to start a print job, image data from the image reading device 202 or from an external device and forms an image corresponding to the image data on the sheet S. At this time, the image forming apparatus 201 performs each step of the image formation based on image forming conditions given in accordance with features of the sheet S. A print job is a series of operations performed based a print signal instructing an image to be formed on the sheet S, in which the sheet S is conveyed and an image is formed thereon, and after the image forming operation is complete, the sheet S is delivered to the placement portion 223. The image forming apparatus 201 acquires the instruction to start the print job from the operation unit 502 or an external device.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The feature amounts of the sheet S are measured by the media sensor 100 before the sheet S reaches the registration roller pair 240. The image forming apparatus 201 sets image forming conditions based on the measured feature amounts, and performs subsequent image formation based on the set image forming conditions. The image forming conditions to be set include, for example, a voltage value of secondary transfer bias applied to the secondary transfer roller 217 during transfer of the toner image to the sheet S, a fixing temperature at the time of fixing the image by the fixing device 201E, and a conveyance speed of the sheet S at the time of fixing.

The registration roller pair 240 corrects skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220*a* and the heating roller 220*b*. The fixing device 201E heats the sheet S with the heating roller 220*b* at the time of sandwiching and conveying the sheet S, to thereby melt and mix the toners of respective colors on the sheet S. Further, the fixing device 201E presses the sheet S with the pressure roller 220*a*, to thereby fix the melted and mixed toners to the sheet S. At this time, the viscosity of the melted toner generates a sticking force to the heating roller 220*b* on the sheet S.

Figure 2A:
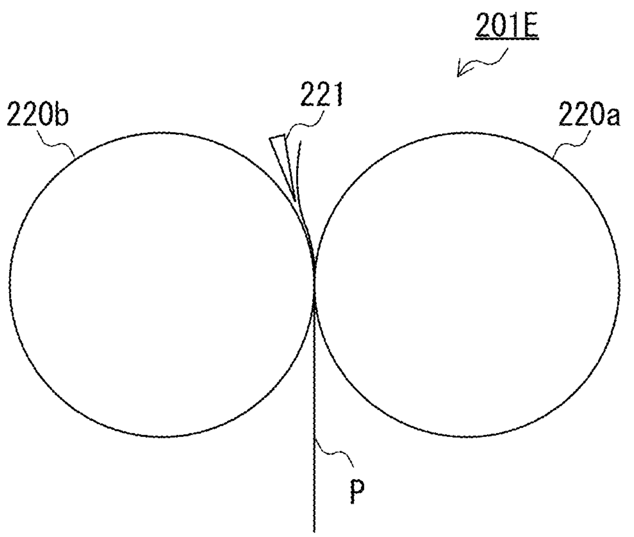
FIG. 2A and FIG. 2B are enlarged views of a fixing device.
Figure 2B:
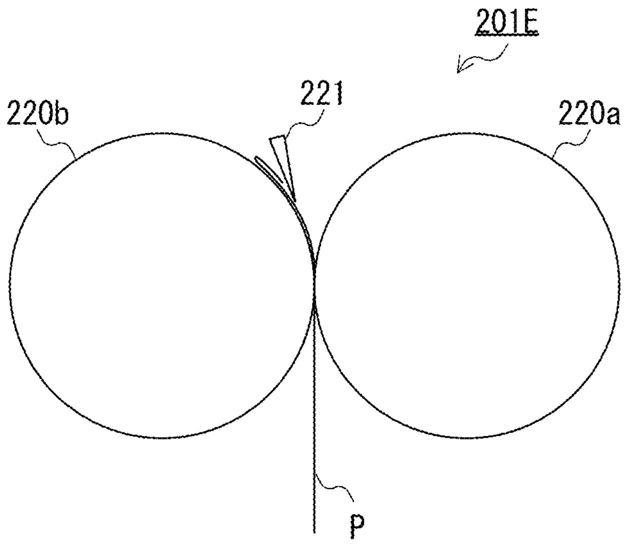

FIG. 2A and FIG. 2B are enlarged views of the fixing device 201E. In a case where the stiffness (strength) of the sheet S is small, the sticking force to the heating roller 220*b* generated on the sheet S may cause the sheet S to be rolled up by the heating roller 220*b* being rotated (FIG. 2B). Thus, a separation plate 221 which separates the sheet S is provided on a downstream side of the heating roller 220*b* in the conveyance direction of the sheet S (FIG. 2A).

The image forming apparatus 201 may determine the state of the separation plate 221 in accordance with the type and basis weight of the sheet S discriminated from the measurement results of the media sensor 100. For example, in a case where the sheet S of a type having a small stiffness is subjected to image formation, the separation plate 221 is arranged such that a distal end of the separation plate 221 is in contact with a surface of the heating roller 220*b* as illustrated in FIG. 2A, to thereby separate the sheet S from the heating roller 220*b*. In a case where the sheet S of a type having a large stiffness is subjected to image formation, the sheet S is not rolled up by the heating roller 220*b*. Thus, the separation plate 221 is arranged such that the distal end of the separation plate 221 is not in contact with the surface of the heating roller 220*b*. In this way, the surface of the heating roller 220*b* can be prevented from being worn by the separation plate 221.

The sheet S having the image fixed thereto is delivered to the delivery space D by any one of the first delivery roller pair 225*a* and the second delivery roller pair 225*b*. The sheet S is placed on a placement portion 223 provided in a protruding manner on a bottom surface of the delivery space D. In a case where images are formed on both sides of the sheet S, the sheet S having an image fixed on one side thereof is conveyed by a reversing roller pair 222 to the re-conveyance passage R. The sheet S is conveyed again to the image forming unit 201B, and an image is formed on another side of the reversed sheet S. The re-conveyance passage R allows the sheet S to be conveyed to the conveyance path between the conveyance roller pair 290 and the registration roller pair 240.

<Controller>

Figure 3:
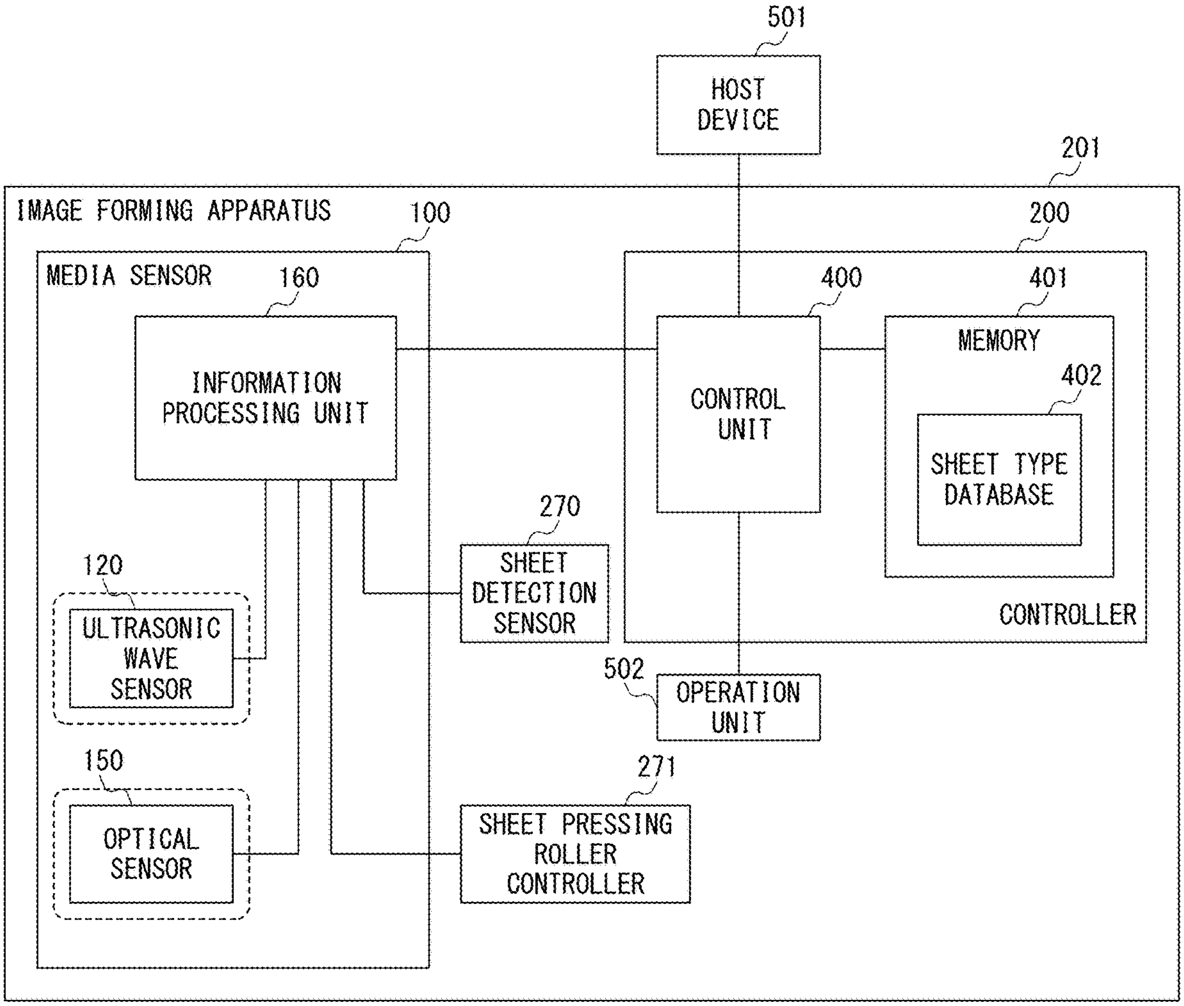
FIG. 3 is an explanatory diagram of a controller.

FIG. 3 is an explanatory diagram of a controller which controls operation of such image forming apparatus 201. A controller 200 is, for example, an information processing device including a central processing unit (CPU). The controller 200 may be achieved by, for example, a microprocessor unit (MPU) or an application specific integrated circuit (ASIC). The controller 200 controls the above-mentioned image forming operation performed by the image forming apparatus 201.

The controller 200 includes a control unit 400 and a memory 401. The memory 401 stores, for example, a control program for the image forming operation, initial values of various setting values, and various types of data required for the image forming operation. Further, the memory 401 has a storage area for storing a sheet type database 402. The sheet type database 402 is a database in which correspondences among sheet feature amounts, sheet types, and image forming conditions are set in advance. The sheet feature amounts are, for example, surface properties and basis weight of the sheet. The control unit 400 is connected to the operation unit 502, a host device 501, which is an external device, and the media sensor 100.

The host device 501 is, for example, a personal computer, an image scanner, or a facsimile machine. The operation unit 502 inputs, for example, instructions and settings received via the input interface to the control unit 400. The operation unit 502 outputs various types of information via the output interface under the control of the control unit 400. As described above, the operation unit 502 includes the display as the output interface, and displays various types of information on the display.

The control unit 400 acquires an instruction to start a print job from the host device 501 or the operation unit 502, and starts the print job. The control unit 400 acquires image data from the host device 501 or the image reading device 202, and performs image processing on the acquired image data. The control unit 400 executes the print job by causing the image forming unit 201B to form a toner image based on the image data that has been subjected to image processing, and feeding the sheet S.

The media sensor 100 includes an information processing unit 160, an ultrasonic wave sensor 120, and an optical sensor 150. In the at least one embodiment, the ultrasonic wave sensor 120 and the optical sensor 150 are used as a sheet measurement unit. In addition to the ultrasonic wave sensor 120 and the optical sensor 150, a sheet detection sensor 270 and a sheet pressing roller controller 271 are connected to the information processing unit 160. The information processing unit 160 is an information processing device achieved by, for example, a CPU, an MPU, or an ASIC. The information processing unit 160 controls measurement operations by the media sensor 100, and processes the measurement results.

The control unit 400 discriminates the sheet type and sets image forming conditions corresponding to the sheet type based on the measurement results (feature amounts of the sheet) of the media sensor 100 processed by the information processing unit 160. The image forming conditions (for example, conveyance speed at the time of fixing, target fixing temperature, and transfer voltage at the time of secondary transfer) vary depending on the physical properties (for example, basis weight, stiffness, surface properties, and material) of the sheet S on which the image is to be formed. Therefore, when forming an image, it is required to set in advance image forming conditions corresponding to the feature amounts of the sheet S to be used.

The sheet detection sensor 270 is a sensor for detecting the sheet S conveyed to the measurement position of the media sensor 100. The control unit 400 temporarily stops the conveyance of the sheet S after a predetermined period of time has elapsed since the detection of the conveyed sheet S by the sheet detection sensor 270. The predetermined period of time is set in advance and is a period of time from when the leading edge of the sheet S is detected by the sheet detection sensor 270 until the leading edge of the sheet S reaches the conveyance roller pair 290. As a result, the sheet S stops at the measurement position of the media sensor 100.

When the conveyance of the sheet S stops, the information processing unit 160 controls the sheet pressing roller controller 271 to move a sheet pressing roller, which is described later. The details are described later, but the sheet pressing roller is movable between a first position which is separated from the media sensor 100 and a second position which is closer to the media sensor 100 than the first position. Other than when the media sensor 100 is measuring the feature amounts of the sheet S, the sheet pressing roller is on standby at the first position. In a case where the conveyance of the sheet S stops, the sheet pressing roller controller 271 moves the sheet pressing roller from the first position to the second position under the control of the information processing unit 160. As a result, the sheet S abuts against the media sensor 100.

The control unit 400 restarts the conveyance of the sheet S in a case where the sheet pressing roller moves to the second position. The information processing unit 160 starts a sheet measurement sequence for measuring the feature amounts of the sheet S in a case where the sheet pressing roller moves to the second position. Through starting the sheet measurement sequence, the information processing unit 160 causes the ultrasonic wave sensor 120 and the optical sensor 150 of the media sensor 100 to perform an operation for measuring the feature amounts.

The ultrasonic wave sensor 120 measures the sheet S by using ultrasonic waves, and outputs an output value of a predetermined voltage value as a measurement result. The information processing unit 160 acquires the output value of the ultrasonic wave sensor 120, and derives the transmittance of the sheet S from the output value given when the sheet S is present and the output value given when the sheet S is not present. The information processing unit 160 detects the basis weight information from the transmittance of the sheet S. The optical sensor 150 is, for example, a contact image sensor (CIS). The information processing unit 160 stores a luminance value of each pixel as an imaging result obtained by the optical sensor 150. The information processing unit 160 converts the stored luminance value of each pixel into surface property information such as a difference integrated value, which is the sum of the differences in luminance values of adjacent pixels, a brightness integrated value, and a peak-to-peak (PP) integrated value.

The information processing unit 160 transmits the basis weight information and the surface property information to the control unit 400. The control unit 400 determines the sheet type and the basis weight of the sheet S based on the acquired basis weight information and surface property information. The control unit 400 discriminates the sheet type of the sheet S based on a plurality of pieces of information stored in the sheet type database 402, and determines the image forming conditions (for example, secondary transfer bias value, target fixing temperature of the fixing device 201E, and conveyance speed at the time of fixing) corresponding to the sheet type and the basis weight. The control unit 400 controls the image forming operation based on the determined image forming conditions. The description given here relates to a method of determining the image forming conditions based on the type and the basis weight of the sheet S, but the method is not limited to this. For example, the control unit 400 determines the type of the sheet S (paper type, paper type information) based on the acquired information corresponding to the surface properties and the basis weight. The control unit 400 may determine one image forming condition corresponding to information corresponding to the type of the sheet S from among the plurality of image forming conditions stored in the sheet type database 402.

<Configuration of Media Sensor>

Figure 4A:
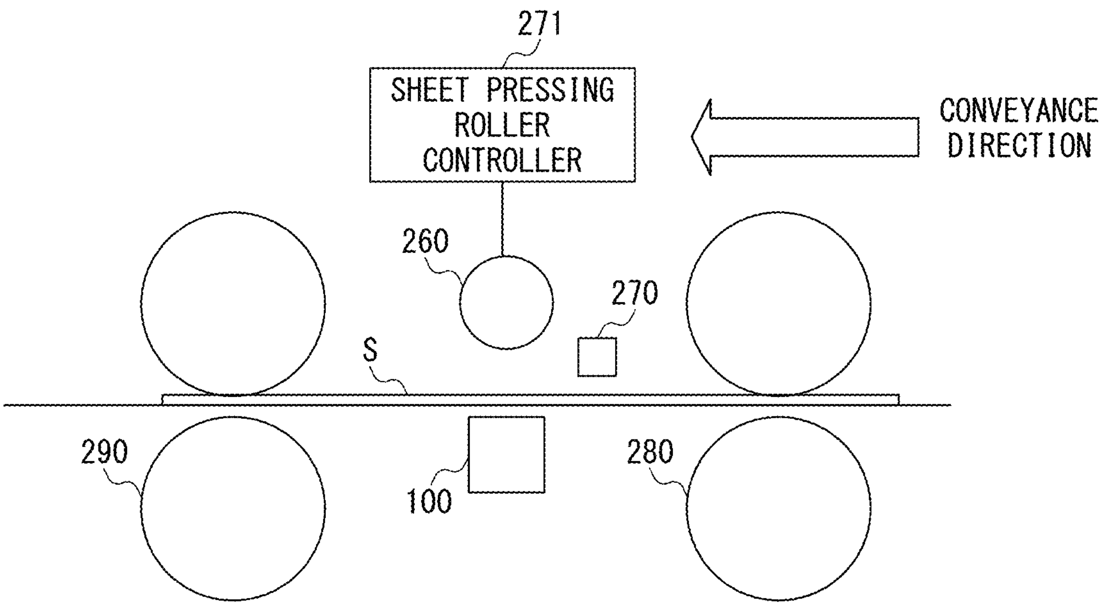
FIG. 4A and FIG. 4B are explanatory views of a configuration of a media sensor.
Figure 4B:
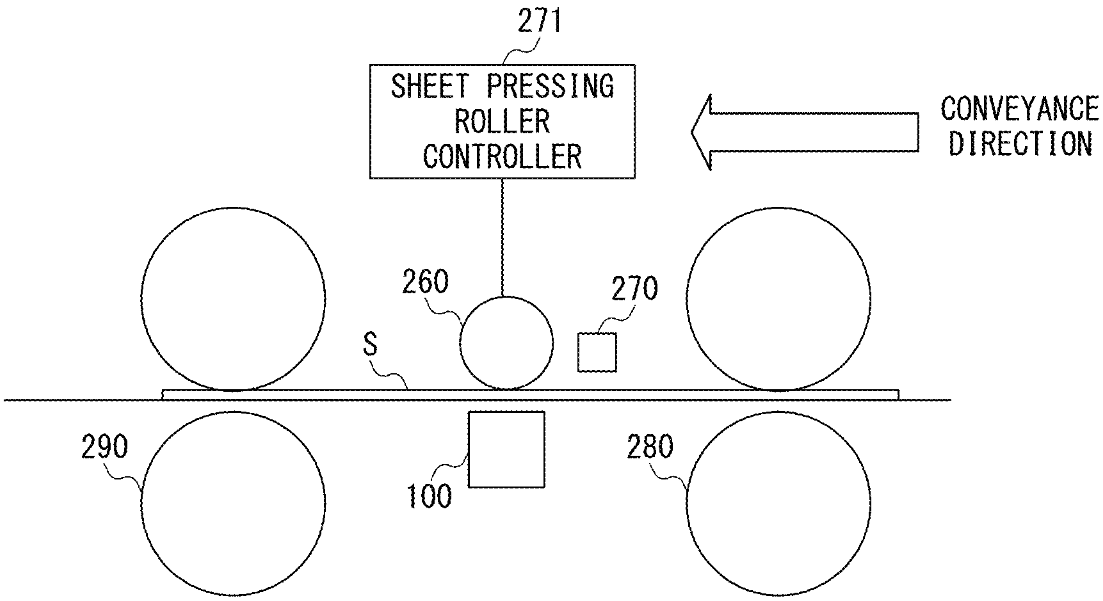
Figure 5A:
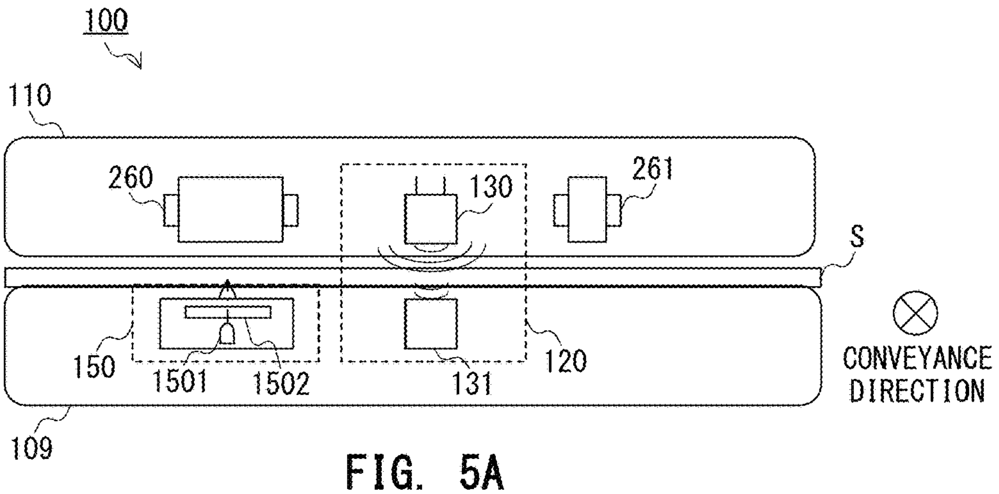
FIG. 5A and FIG. 5B are explanatory views of a configuration of a media sensor.
Figure 5B:
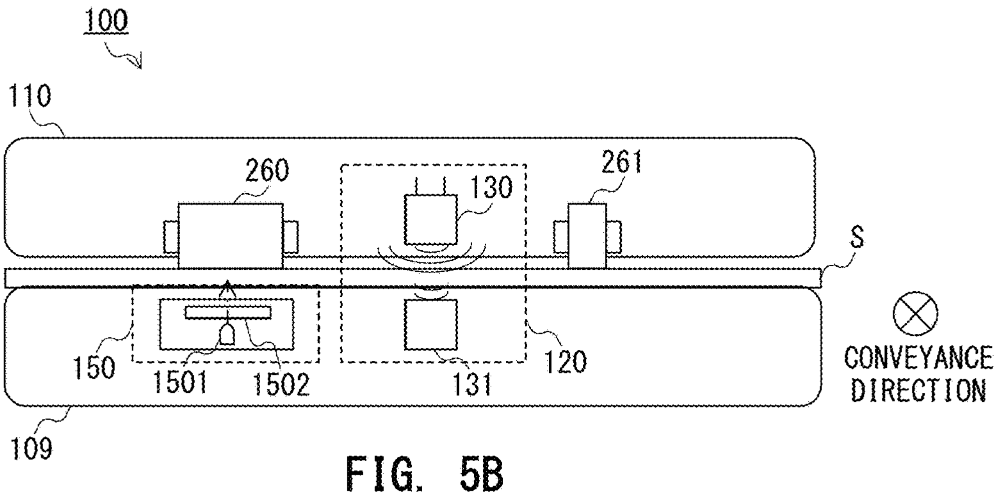

FIG. 4A and FIG. 4B and FIG. 5A and FIG. 5B are explanatory views of the configuration of the media sensor 100. FIG. 4A and FIG. 4B are views of the media sensor 100 viewed from a direction orthogonal to the conveyance direction of the sheet S. FIG. 5A and FIG. 5B are views of the media sensor 100 viewed from the upstream side in the conveyance direction of the sheet S.

As illustrated in FIG. 4A and FIG. 4B, the media sensor 100 is arranged between the conveyance roller pair 280 and the conveyance roller pair 290, and acquires the feature amounts (basis weight information and surface property information) of the conveyed sheet S. The sheet detection sensor 270 is arranged on the upstream side of the media sensor 100 (on the conveyance roller pair 280 side) in the conveyance direction of the sheet S. A sheet pressing roller 260 is arranged at a position facing the media sensor 100 with respect to the conveyance path of the sheet S. As described above, the sheet pressing roller 260 is configured to move between the first position which is separated from the media sensor 100 and the second position which is close to the media sensor 100. In FIG. 4A, there is illustrated a state in which the sheet pressing roller 260 is arranged at the first position. In FIG. 4B, there is illustrated a state in which the sheet pressing roller 260 is arranged at the second position. Through arranging the sheet pressing roller 260 at the second position, the sheet S is pressed against the media sensor 100.

As illustrated in FIG. 5A and FIG. 5B, in the media sensor 100, the ultrasonic wave sensor 120 and the optical sensor 150 are arranged at the same position in the conveyance direction of the sheet S, and are arranged side by side in the direction orthogonal to the conveyance direction. The ultrasonic wave sensor 120 includes an ultrasonic wave transmitter 130 and an ultrasonic wave receiver 131. The optical sensor 150 is a CIS including a light source 1501 (for example, an LED) and a line sensor 1502. The optical sensor 150 may be configured by using a CCD image sensor or a CMOS image sensor.

The optical sensor 150 measures the luminance value of received light in order to measure the surface properties of the sheet S. For this purpose, it is required that the sheet S be held at an optical focus position of the optical sensor 150. In a case where the ultrasonic wave sensor 120 measures the sheet S, measurement accuracy is improved when there is no influence due to fluttering of the conveyed sheet S. For this reason, it is required that the sheet S be conveyed with a stable posture.

In the at least one embodiment, in order to convey the sheet S with a stable posture, the sheet pressing roller 260 and a sheet pressing roller 261 are arranged between the conveyance roller pair 280 and the conveyance roller pair 290. The sheet pressing roller 260 and the sheet pressing roller 261 are arranged at the same position in the conveyance direction of the sheet S. The sheet pressing roller 260 is arranged facing the optical sensor 150 across the conveyance path, and is configured to press the sheet S toward the optical sensor 150. In FIG. 5A, there is illustrated a state in which the sheet pressing rollers 260 and 261 are arranged at the first position. In FIG. 5B, there is illustrated a state in which the sheet pressing rollers 260 and 261 are arranged at the second position.

When arranged at the second position, the sheet pressing rollers 260 and 261 are pressed against the sheet S, which has stopped being conveyed. The sheet S is pressed against the media sensor 100 by the sheet pressing rollers 260 and 261. That is, the sheet pressing rollers 260 and 261 are pressing members that press the sheet S and cause the sheet S to abut against the media sensor 100. As a result, the sides of the sheet S which are orthogonal to the conveyance direction are maintained parallel to the direction of the line sensor 1502. In this state, variation in the position and the orientation of the sheet S is reduced, and thus the media sensor 100 can measure the feature amounts of the sheet S, such as surface properties and basis weight, in a stable state.

In a case where the sheet pressing rollers 260 and 261 are arranged at the second position without the conveyance of the sheet S being stopped, the conveyance causes the sheet S to flutter, which may cause the sheet S to skew or jam. It is important that the longitudinal direction of the line sensor 1502 be orthogonal to the conveyance direction of the sheet S. For this purpose, the sheet pressing rollers 260 and 261 are pressed against the stopped sheet S, making it possible to stably measure the feature amounts. The control unit 400 restarts the conveyance of the sheet S with the posture of the sheet S in a stable state, and at the same time, instructs the information processing unit 160 to measure the feature amounts of the sheet S by using the media sensor 100. In response to that instruction, the information processing unit 160 starts measuring the feature amount of sheet S by using the media sensor 100.

<Measurement of Basis Weight>

In the ultrasonic wave sensor 120, the ultrasonic wave transmitter 130 and the ultrasonic wave receiver 131 are arranged at opposing positions across the conveyance path. The ultrasonic wave transmitter 130 is arranged on an upper block 110 side of the media sensor 100. The ultrasonic wave receiver 131 is arranged on a lower block 109 side of the media sensor 100. The ultrasonic wave sensor 120 receives ultrasonic waves output from the ultrasonic wave transmitter 130 via the conveyance path of the sheet S by the ultrasonic wave receiver 131. The ultrasonic wave receiver 131 outputs information (output value) for determining the basis weight of the sheet S based on the received ultrasonic waves.

The ultrasonic wave transmitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave transmitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave transmitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a voltage value corresponding to the basis weight of the sheet S. The output voltage is transmitted as an output value to the information processing unit 160.

Figure 6:
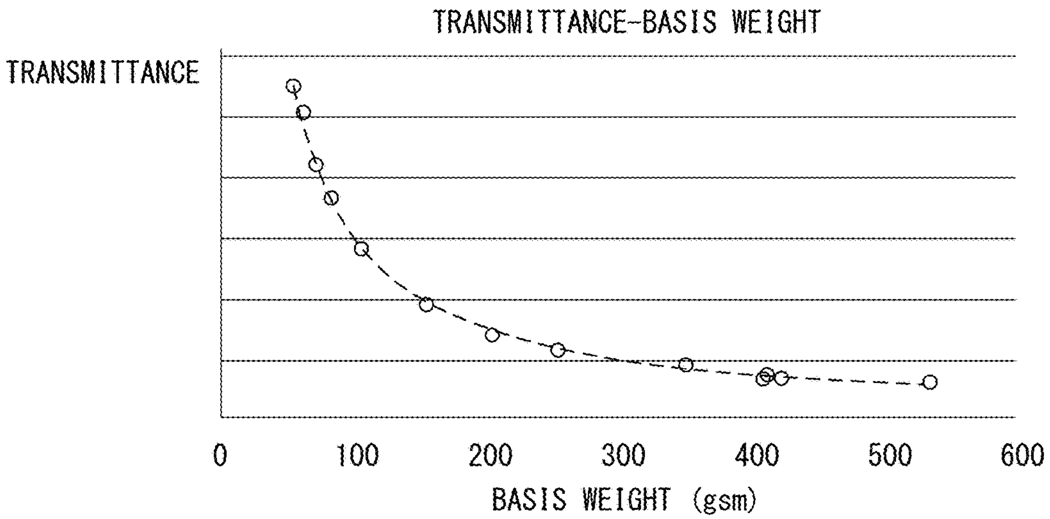
FIG. 6 is an explanatory diagram of a relationship between transmittance and basis weight.

The ratio between the output voltage given when the sheet S is not present and the output voltage given when the sheet S is present between the ultrasonic wave transmitter 130 and the ultrasonic wave receiver 131 is the transmittance. The transmittance of the ultrasonic waves changes in accordance with the basis weight (area density) of the sheet S. Thus, the basis weight of the sheet S can be estimated by using a conversion formula or a conversion table between transmittance and basis weight. FIG. 6 is an explanatory diagram of the relationship between transmittance and basis weight. The basis weight is estimated by using a conversion formula or a conversion table expressing such a relationship.

<Measurement of Surface Properties>

Figure 7A:
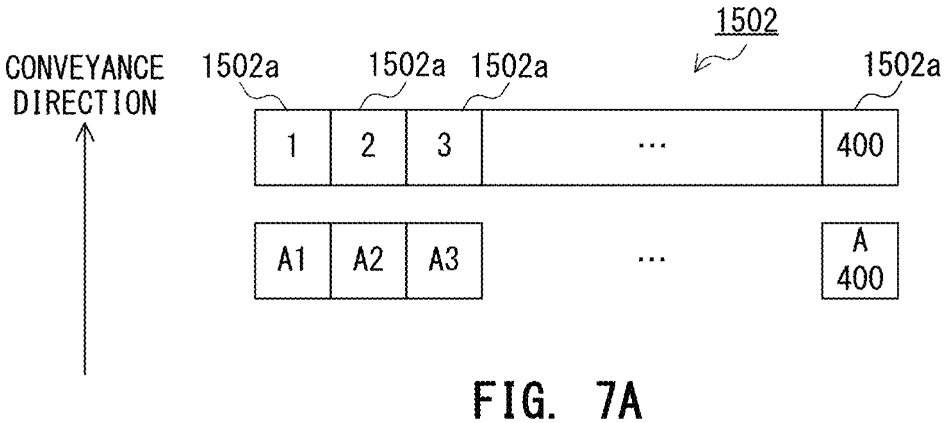
FIG. 7A and FIG. 7B are explanatory diagrams of a reading result obtained by an optical sensor.
Figure 7B:
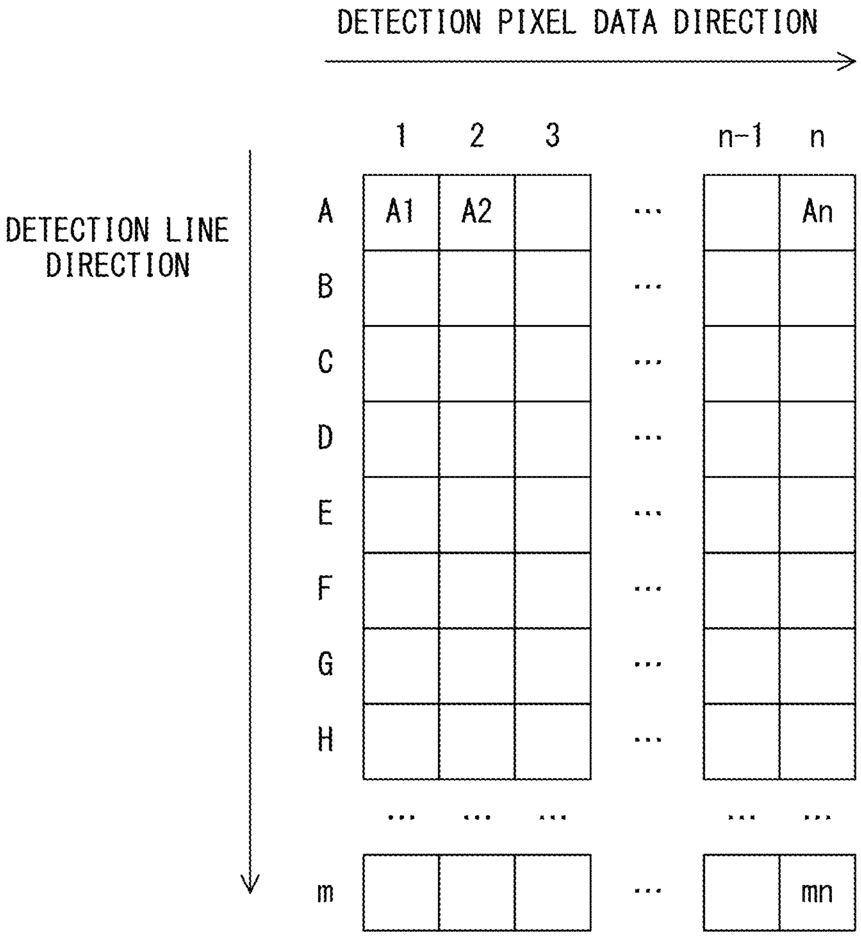

The surface properties of the sheet S are detected by the optical sensor 150. Light emitted from the light source 1501 illuminates the sheet S at a constant angle by a light guide (not shown). The sheet S reflects the irradiated light. The light reflected by the sheet S forms an image on the line sensor 1502 via a lens (not shown). In this way, the line sensor 1502 can read the light reflected from sheet S as an image. FIG. 7A and FIG. 7B are explanatory diagrams of a reading result obtained by the optical sensor 150.

In FIG. 7A, an example of an image read by the line sensor 1502 is illustrated. The line sensor 1502 includes a plurality of light receiving elements 1502*a*. The plurality of light receiving elements 1502*a* are arranged in a direction orthogonal to the conveyance direction of the sheet S, and thus the line sensor 1502 can read an image corresponding to one line at a time. In the example of FIG. 7A, 400 light receiving elements 1502*a* are arranged, and the line sensor 1502 can thus read an image of 400 pixels (A1 to A400) at a time.

In the at least one embodiment, a plurality of light receiving elements 1502*a* are arranged to achieve a resolution of 300 dpi. The image corresponding to one line which is read at a time by the line sensor 1502 is insufficient as the information amount for determining the surface properties of the sheet S. This is because in an image corresponding to one line, there is a large deviation in the reading results of each reading position. For that reason, the optical sensor 150 performs the reading operation a plurality of times on the conveyed sheet S, and acquires the reading results of the images of a plurality of lines of the sheet S. Through connecting the reading results of a plurality of lines in the conveyance direction of the sheet S, it becomes possible to determine the trend of the surface properties of the sheet S for a predetermined size.

The information processing unit 160 performs digital processing on the image read by the optical sensor 150, and stores the results of the digital processing as an output value (luminance value) of each pixel. The information processing unit 160 acquires and stores a difference integrated value, a brightness integrated value, and a PP integrated value of the luminance value from the stored luminance value of each pixel. Those values are the surface property information of the sheet S.

The difference integrated value is a value obtained by summing the results of integrating the difference in the luminance values of each adjacent pixel of the image read by the line sensor 1502 for the number of lines. The difference integrated value is an index expressing the unevenness of the sheet. In FIG. 7B, in a case where the detection value of each pixel is represented by a pixel position (1 to n) and a detection line (A to m), a difference integrated value Y is expressed based on the following equation (1) by using a difference integrated value "k" for each line. The detection pixel data direction of FIG. 7B is the arrangement direction of the light receiving elements 1502*a* of the line sensor 1502 (the direction of one line of pixels). Further, the detection line direction of FIG. 7B is the conveyance direction of the sheet S.

$$\begin{aligned} k1 &= |A2 - A1| + |A3 - A2| \ \ldots + |An - A(n-1)| \\ k2 &= |B2 - B1| + |B3 - B2| \ \ldots + |Bn - B(n-1)| \\ &\vdots \\ km &= |m2 - m1| + |m3 - m2| \ \ldots + |mn - m(n-1)| \\ Y &= k1 + k2 + \ldots + km \end{aligned} \tag{1}$$

The brightness integrated value is the sum of the integrated values of the luminance value of each pixel received by the line sensor 1502 for the number of detection lines, and represents the brightness of the surface of the sheet S. A brightness integrated value M is expressed by the following equation (2).

$$M = A1 + A2 + \ldots + B1 + B2 + \ldots + mn \tag{2}$$

The PP integrated value is a value obtained by summing the difference between the maximum value and the minimum value of the luminance value of one line for the number of detection lines. A transparent film made of a resin such as PET reflects less of the light irradiated from the light source 1501, and is detected as having a low brightness. For a sheet such as an embossed paper sheet having a surface which has been intentionally provided with geometrical unevenness, the unevenness increases the difference in luminance between adjacent pixels, resulting in a large difference integrated value. For a recycled paper sheet, the luminance value is uneven in the fiber orientation, and the pulp fibers become shorter after going through several recycling processes, and thus the surface properties tend to be detected as being rough. Meanwhile, for a coated paper sheet, the coating layer on the surface causes the paper sheet to appear less uneven, and the difference integrated value tends to be smaller. The brightness integrated value and the PP integrated value are parameters used to discriminate those sheets.

The control unit 400 acquires basis weight information and surface property information (difference integrated value, brightness integrated value, PP integrated value) as feature amounts of the sheet S from the information processing unit 160, and determines image forming conditions by referring to the sheet type database 402. The control unit 400 performs image formation corresponding to the print job based on the determined image forming conditions.

<Determination of Image Forming Conditions>

Figure 8:
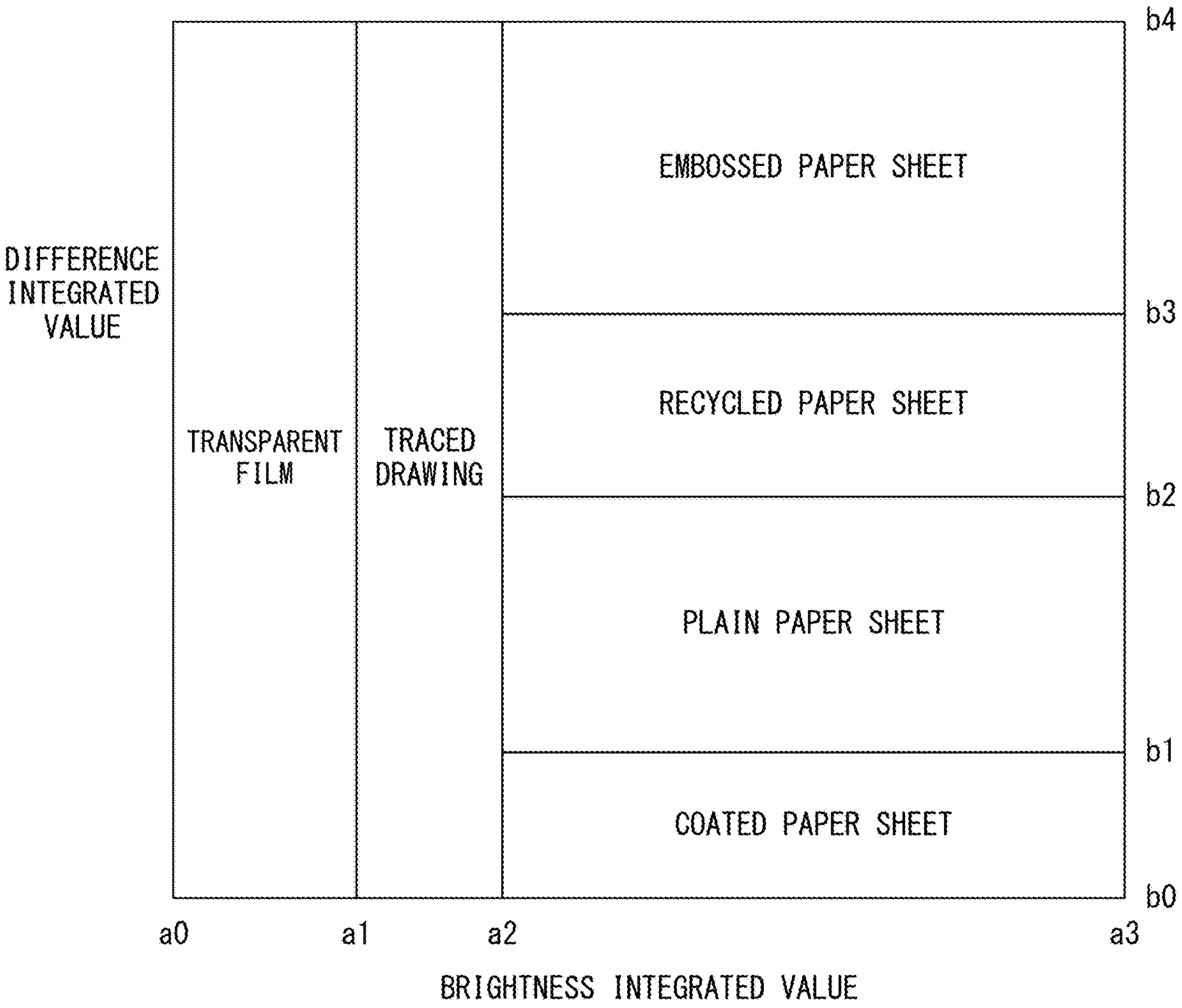
FIG. 8 is an exemplary diagram of a classification table of sheet types.
Figure 9:
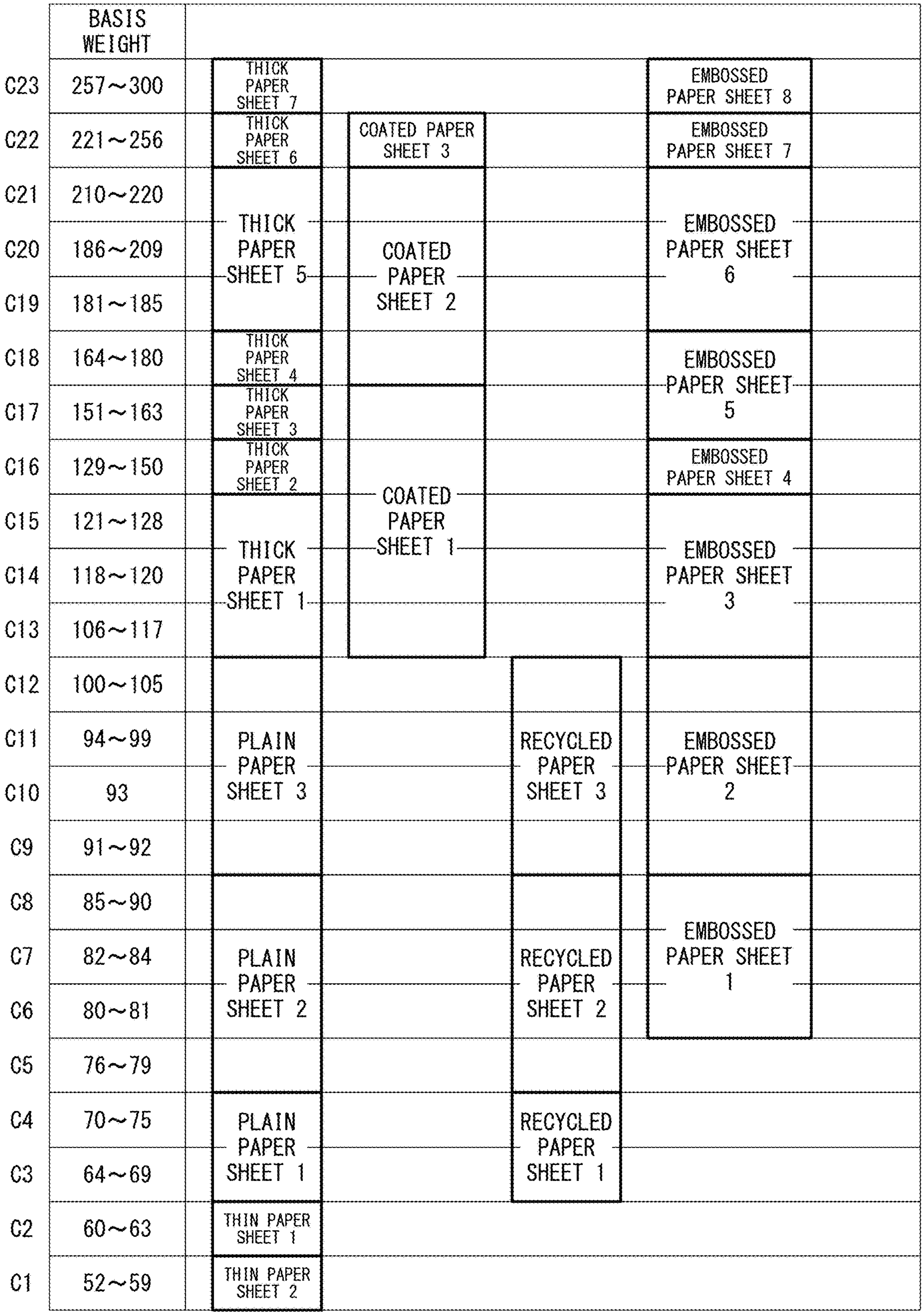
FIG. 9 is an exemplary diagram of a classification table of sheet types.

As described above, the control unit 400 acquires basis weight information and surface property information (difference integrated value, brightness integrated value, PP integrated value) from the media sensor 100. The control unit 400 determines the surface properties of the sheet S based on the surface property information, and classifies the sheet type of the sheet S based on the surface properties. FIG. 8 and FIG. 9 are exemplary diagrams of classification tables of sheet types. The control unit 400 classifies the sheet type based on such classification tables.

FIG. 8 is a classification table of sheet types based on a difference integrated value and a brightness integrated value. In FIG. 8, the table is a matrix in which the vertical axis represents the difference integrated value and the horizontal axis represents the brightness integrated value, and the surface properties of the sheet are measured in advance and the sheet type is classified by machine learning. Threshold values for classifying the sheet types are a0 to a3 for the brightness integrated value and b0 to b4 for the difference integrated value. Those threshold values are stored in the sheet type database 402 of the memory 401. It is noted that such a classification table may be a three-dimensional matrix that can classify sheet types in more detail by also adding the PP integrated value as a parameter. The control unit 400 discriminates the sheet type by comparing the surface property information with each threshold value.

FIG. 9 is a classification table of sheet types based on a basis weight. The sheet type is determined based on which basis weight range the basis weight measured by the media sensor 100 falls within. Threshold values indicating the basis weight range are indicated by C1 to C23, and are stored in the sheet type database 402 of the memory 401.

The control unit 400 discriminates the sheet type based on the basis weight information acquired from the media sensor 100 and the basis weight range of the classification table shown in FIG. 9 of the sheet type determined based on the surface property information and the classification table of FIG. 8. The control unit 400 determines the image forming conditions corresponding to the determined sheet type. FIG. 10 is a classification table of sheet type which summarizes the classification tables of FIG. 8 and FIG. 9. Such a classification table may be stored in the sheet type database 402 of the memory 401, and the control unit 400 may determine the image forming conditions based on such a classification table.

Thus, the control unit 400 compares the measurement results acquired from the media sensor 100 with the sheet type database 402 to determine the image forming conditions (for example, conveyance speed at the time of fixing, target fixing temperature, and transfer voltage at the time of secondary transfer). When it is required to update the image forming conditions because the determined image forming conditions are different from the image forming conditions that are already set, the control unit 400 again stops the conveyance of the sheet S and changes the image forming conditions. After the image forming conditions are changed, the control unit 400 restarts the conveyance of the sheet S and performs image formation.

Figure 11:
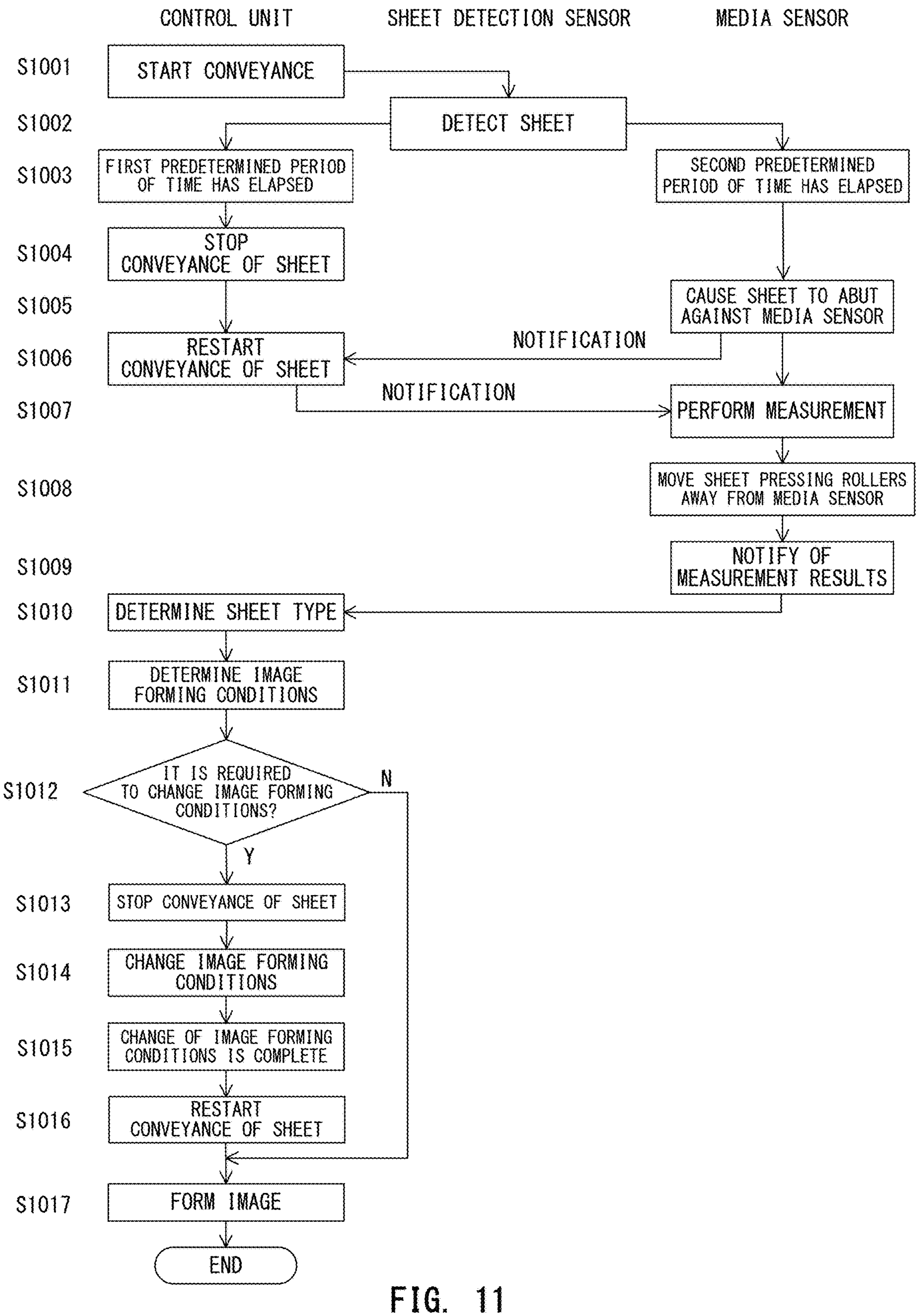
FIG. 11 is a processing flowchart for illustrating image forming processing.

FIG. 11 is a processing flowchart for illustrating image forming processing including processing for determining image forming conditions. As described above, the image forming conditions are determined by the control unit 400, the sheet detection sensor 270, and the media sensor 100 working in cooperation. The processing is started in a case where the control unit 400 acquires an instruction to start a print job from the operation unit 502 or the host device 501.

In a case where the control unit 400 acquires an instruction to start a print job, the control unit 400 starts the conveyance of the sheet S (Step S1001). The sheet S is fed from the cassette sheet-feeding unit 230 or the manual sheet-feeding unit 235. In a case where conveyance of the sheet S is started, the control unit 400 and the media sensor 100 wait until the sheet detection sensor 270 detects the sheet S (Step S1002).

In a case where the sheet detection sensor 270 detects the sheet S, the control unit 400 waits until a first predetermined period of time elapses (Step S1003), and stops the conveyance of the sheet S after the first predetermined period of time has elapsed (Step S1004). The first predetermined period of time is a period of time from when the leading edge of the sheet S is detected by the sheet detection sensor 270 until the leading edge of the sheet S reaches the conveyance roller pair 290.

In a case where the sheet detection sensor 270 detects the sheet S, the information processing unit 160 of the media sensor 100 waits until a second predetermined period of time elapses (Step S1003), and after the second predetermined period of time has elapsed, causes the sheet pressing roller controller 271 to move the sheet pressing rollers 260 and 261 to the second position. Through moving the sheet pressing rollers 260 and 261 to the second position, the sheet S abuts against the media sensor 100 (Step S1005). The second predetermined period of time during which the information processing unit 160 waits is longer than the first predetermined period of time during which the control unit 400 waits, and is a period of time from when the leading edge of the sheet S is detected by the sheet detection sensor 270 until the conveyance of the sheet S stops (period of time from Step S1002 to Step S1004).

The information processing unit 160 notifies the control unit 400 that the sheet S has abutted against the media sensor 100. In a case where the control unit 400 acquires the notification that the sheet S has abutted against the media sensor 100, the control unit 400 restarts the conveyance of the sheet S (Step S1006). The control unit 400 notifies the media sensor 100 that conveyance of the sheet S has been restarted. In a case where the information processing unit 160 acquires the notification of the restarting of the conveyance of the sheet S, the information processing unit 160 starts measurement of the sheet S by the ultrasonic wave sensor 120 and the optical sensor 150 (Step S1007). In a case where the measurement ends, the information processing unit 160 causes the sheet pressing roller controller 271 to move the sheet pressing rollers 260 and 261 to the first position and away from the media sensor 100 (Step S1008). The information processing unit 160 notifies the control unit 400 of the measurement results (basis weight information and surface property information) (Step S1009).

The control unit 400 refers to the sheet type database 402 based on the acquired measurement results, and determines the sheet type (Step S1010). The control unit 400 determines the image forming conditions based on the determined sheet type (Step S1011). The control unit 400 determines whether or not it is required to change the image forming conditions by determining whether or not the determined image forming conditions are different from the current image forming conditions (Step S1012).

When it is required to change the image forming conditions (Step S1012: Y), the control unit 400 again stops the conveyance of the sheet S (Step S1013). The control unit 400 changes the image forming conditions after conveyance of the sheet S stops (Step S1014). When the change of the image forming conditions is complete (Step S1015), the control unit 400 restarts the conveyance of the sheet S (Step S1016). For example, in a case where the current image forming conditions are image forming conditions corresponding to a plain paper sheet, and the image forming conditions determined from the measurement results of the media sensor 100 are image forming conditions corresponding to a thick coated paper sheet, it is required to change the image forming conditions. In this case, for example, the fixing temperature is changed from 200° C. to 230° C. During that time, several seconds are required, and the conveyance of the sheet S is stopped for that period of time.

After restarting conveyance of the sheet S, the control unit 400 then controls image formation on the sheet S (Step S1017). It is noted that when it is not required to change the image forming conditions (Step S1012: N), the control unit 400 controls image formation without stopping the conveyance of the sheet S or changing the image forming conditions (Step S1017).

Thus, when it is required to change the image forming conditions, conveyance of the sheet S is temporarily stopped and the image forming conditions are changed, and hence an image is formed on the sheet S based on the optimal image forming conditions corresponding to the type. Therefore, the image quality of the image printed on the sheet S is maintained. In addition to temporarily stopping the conveyance of the sheet S and changing the image forming conditions, the conveyance speed of the sheet S may be slowed down to a predetermined conveyance speed and the image forming conditions may be changed. As long as the sheet S is conveyed to the secondary transfer unit 201D in a period of time required to set the optimal image forming conditions corresponding to the type, it does not matter whether the conveyance is temporarily stopped or the conveyance speed is adjusted.

Modification Example

Figure 12:
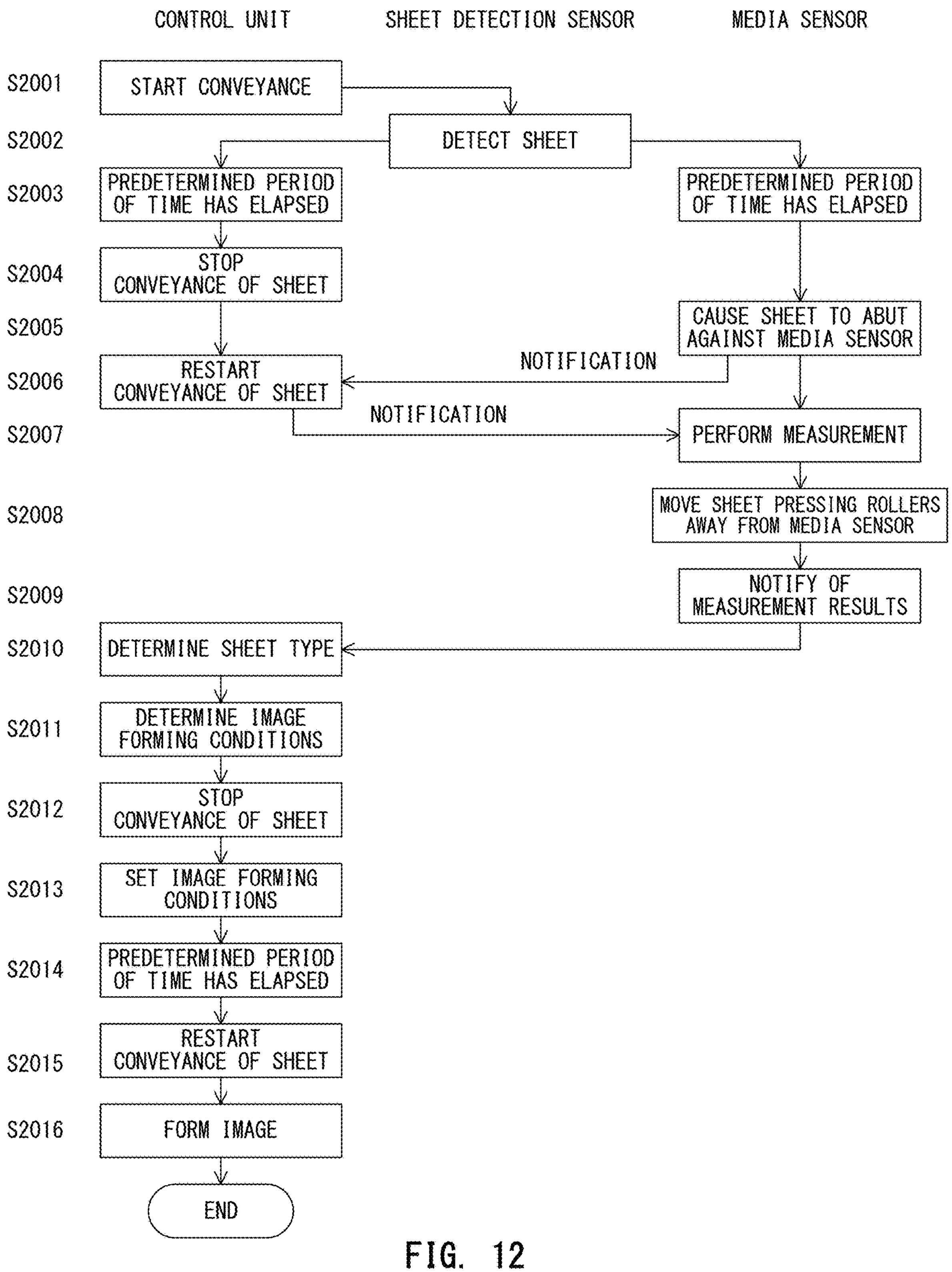
FIG. 12 is another processing flowchart for illustrating image forming processing.

FIG. 12 is another processing flowchart for illustrating image forming processing including processing for determining image forming conditions. The processing from the start of conveyance of the sheet S to the determination of the image forming conditions (Step S2001 to Step S2011) is the same as the processing steps of from Step S1001 to Step S1011 of FIG. 11, and therefore description of those processing steps is omitted here.

After determining the image forming conditions, the control unit 400 then stops the conveyance of the sheet S (Step S2012), and sets the image forming conditions (Step S2013). In a case where a predetermined period of time has elapsed since the start of setting the image forming conditions (Step S2014), the control unit 400 restarts the conveyance of the sheet S (Step S2015). The predetermined period of time is the maximum period of time required to change the image forming conditions. After that, the control unit 400 starts image formation (Step S2016).

Through setting a predetermined period of time from setting the image forming conditions to restarting the conveyance of the sheet S as the maximum period of time required to change the image forming conditions, image formation using the optimal image forming conditions is possible based on a simple sequence.

In the above description, the media sensor 100 is arranged in the image forming apparatus 201, but as long as the media sensor 100 is arranged on the upstream side of the secondary transfer unit 201D in the conveyance direction of the sheet, the media sensor 100 may be arranged external to the image forming apparatus 201. Further, the processing by the information processing unit 160 in the media sensor 100 may be performed by the control unit 400. In contrast, the processing performed by the control unit 400 may be performed by the information processing unit 160. In this case, the sheet type database 402 may be stored in a memory which can be accessed from the information processing unit 160. In any case, it suffices that the above-mentioned processing be performed by the control unit 400 and the information processing unit 160 in cooperation.

In addition, the image forming apparatus 201 described above determines control parameters such as the image forming conditions by detecting the type and the basis weight of the sheet S from the feature amounts of the sheet S measured by the media sensor 100. However, the control parameters may be directly determined from the feature amounts. The media sensor 100 may be a device which measures the physical properties of another sheet.

Description of the operation of the sheet pressing roller 260 with respect to the optical sensor 150 has been given above. The sheet pressing roller 260 is arranged so as to sandwich the ultrasonic wave sensor 120 between the sheet pressing roller 260 and the sheet pressing roller 261 (see FIG. 5A and FIG. 5B). With this configuration, in a case where the sheet S reaches the measurement position of the media sensor 100, the sheet pressing roller 260 and the sheet pressing roller 261 press the sheet S against the media sensor 100 at the measurement position of the ultrasonic wave sensor 120. The ultrasonic wave sensor 120 transmits ultrasonic waves through the sheet S and measures feature amounts. The state of the sheet S is stabilized by the sheet pressing roller 260 and the sheet pressing roller 261, and thus the feature amounts of the sheet S can be accurately measured by the ultrasonic wave sensor 120.

Figure 13:
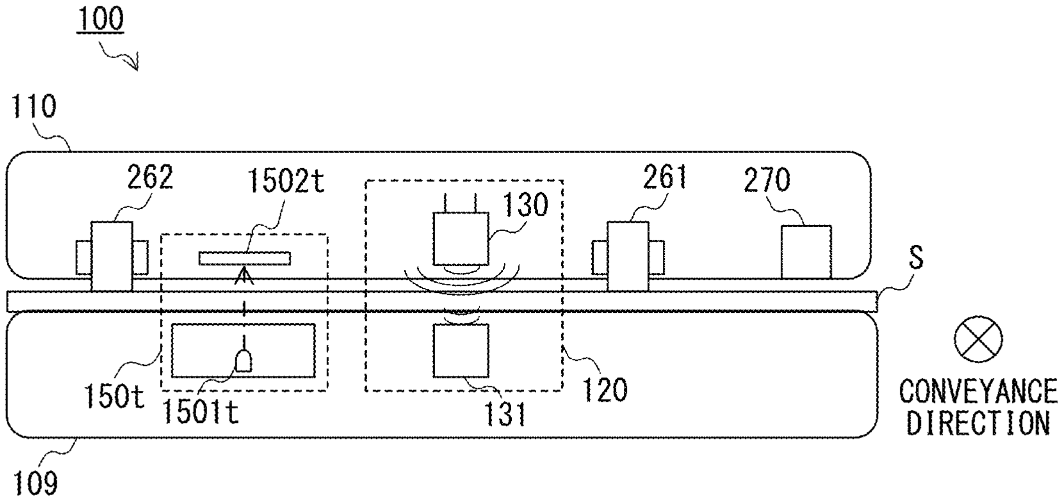
FIG. 13 is an explanatory view of a configuration of a media sensor.

Similarly, the sheet pressing roller 260 and the sheet pressing roller 261 are effective in a case where a transmission optical sensor is used. FIG. 13 is an explanatory view of a configuration of a media sensor which uses a transmission optical sensor 150*t*. The transmission optical sensor 150*t* transmits light through the sheet S and measures feature amounts. For that purpose, a light source 1501*t* and a line sensor 1502*t* are arranged facing each other across the conveyance path. Further, the sheet pressing roller 260 is not included, and a sheet pressing roller 262 is arranged facing the sheet pressing roller 261 so as to sandwich the transmission optical sensor 150*t*. The state of the sheet S is stabilized by the sheet pressing roller 261 and the sheet pressing roller 262, and thus the feature amounts of the sheet S can be accurately measured by the transmission optical sensor 150*t* as well. In other words, the state of the sheet S is stabilized by, in addition to the sheet pressing roller 260 directly pressing the sheet S against the transmission optical sensor 150, the two rollers pressing the sheet S against the optical sensor 150*t* as well. As a result, the sheet S can be stably measured even by the transmission optical sensor 150*t*.

The media sensor 100 described above is an example, and is not limited to a configuration including the optical sensor 150 and the ultrasonic wave sensor 120. The media sensor 100 may include another sensor which can measure a feature amount of the sheet S. Further, the media sensor 100 may include any one of the optical sensor 150 and the ultrasonic wave sensor 120.

Further, in the above description, a configuration in which the sheet type database 402 is included in the memory 401 of the controller 200 has been described, but the storage location of the sheet type database 402 is not limited to this. For example, the sheet type database 402 may be stored in the media sensor 100. In this case, the information processing unit 160 determines the type and the basis weight of the sheet S, and the information processing unit 160 also determines the image forming conditions. Further, the controller 200 including the sheet type database 402 may be placed in a cloud. In this case, when the image forming apparatus 201 is connected to the cloud via a network, the image forming conditions can be set based on the latest sheet type database or discrimination algorithm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-149049, filed Sep. 14, 2023, which is hereby incorporated by reference herein in its entirety.

What is claimed is:

1. An image forming apparatus comprising:

a conveyance unit configured to convey a sheet;

a measurement unit for measuring a feature amount of the sheet conveyed by the conveyance unit;

a sheet detection sensor for detecting the sheet conveyed by the conveyance unit;

a pressing member movable between a first position separated from the measurement unit and a second position closer to the measurement unit than the first position;

a moving unit configured to move the pressing member;

an image forming unit configured to form, based on a predetermined image forming condition, an image on the sheet conveyed by the conveyance unit; and a controller, wherein the controller is configured to:

stop conveyance of the sheet by the conveyance unit in a case where the sheet is detected by the sheet detection sensor, and control the moving unit to move the pressing member from the first position to the second position;

control, under a state in which the pressing member is arranged at the second position, the conveyance unit to restart the conveyance of the sheet to control the measurement unit to measure the feature amount of the sheet, and determine the predetermined image forming condition based on the measured feature amount; and stop the conveyance of the sheet by the conveyance unit before the image forming unit forms an image on the sheet to set the predetermined image forming condition in the image forming unit, and restart the conveyance of the sheet by the conveyance unit to control the image forming unit to form an image based on the predetermined image forming condition.

2. The image forming apparatus according to claim 1,
wherein the controller is configured to stop the conveyance of the sheet by the conveyance unit to control the moving unit to move the pressing member to the second position in a case where a first predetermined period of time has elapsed since detection of the sheet by the sheet detection sensor,
wherein the controller is configured to control the measurement unit to measure the feature amount of the sheet in a case where a second predetermined period of time has elapsed since the detection of the sheet by the sheet detection sensor, and
wherein the second predetermined period of time is longer than the first predetermined period of time.

3. The image forming apparatus according to claim 2,
wherein the conveyance unit includes a first conveyance roller pair arranged on an upstream side of the measurement unit in a conveyance direction of the sheet, and a second conveyance roller pair arranged on a downstream side of the measurement unit in the conveyance direction of the sheet,
wherein the sheet detection sensor is arranged between the first conveyance roller pair and the measurement unit,
wherein the first predetermined period of time is a period of time from when a leading edge of the sheet is detected by the sheet detection sensor until the leading edge of the sheet reaches the second conveyance roller pair, and
wherein the second predetermined period of time is period of time from when the leading edge of the sheet is detected by the sheet detection sensor until the conveyance of the sheet stops.

4. The image forming apparatus according to claim 1, wherein the controller is configured to stop the conveyance of the sheet by the conveyance unit to update the predetermined image forming condition in a case where the determined predetermined image forming condition is different from a current image forming condition.

5. The image forming apparatus according to claim 4, wherein the controller is configured to restart the conveyance of the sheet in a case where update of the predetermined image forming condition is complete.

6. The image forming apparatus according to claim 1, wherein the controller is configured to restart the conveyance of the sheet by the conveyance unit in a case where a predetermined period of time has elapsed since start of setting of the determined predetermined image forming condition.

7. The image forming apparatus according to claim 6, wherein the predetermined period of time is a maximum period of time required to change the predetermined image forming condition.

8. The image forming apparatus according to claim 1, wherein the controller is configured to determine a sheet type of the sheet based on the feature amount of the sheet measured by the measurement unit, and determine an image forming condition corresponding to the sheet type.

9. The image forming apparatus according to claim 1, wherein the controller is configured to control the moving unit to move the pressing member to the first position in a case where the measurement of the feature amount of the sheet by the measuring unit ends.

10. The image forming apparatus according to claim 9, wherein the pressing member is a rotating member.

* * * * *